Dec. 31, 1968     Z. B. DIENES     3,419,669
FLEXIBLE MOLD AND CABLE SPLICE
Filed March 15, 1965
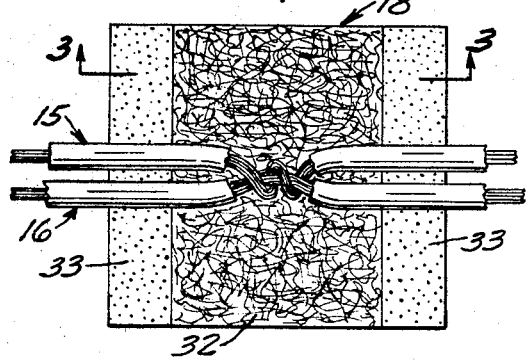
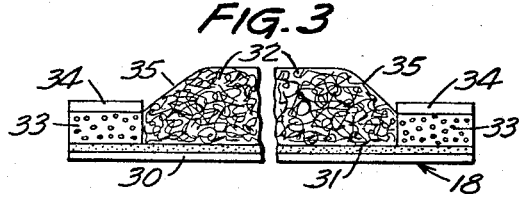
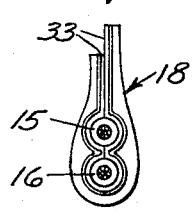
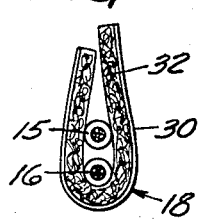
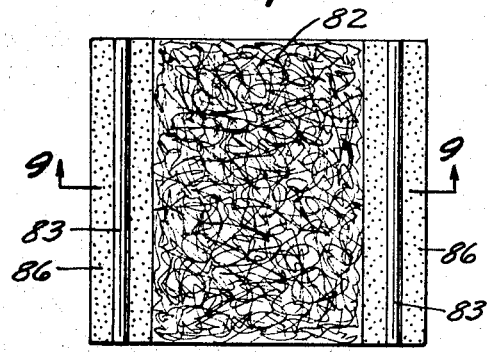
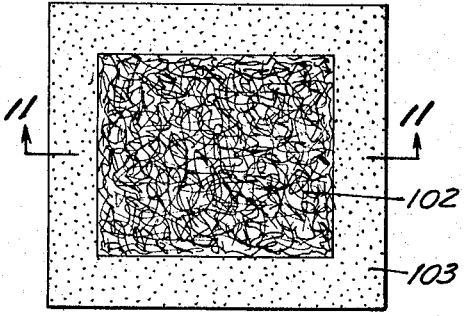
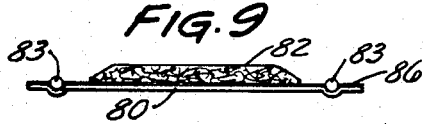
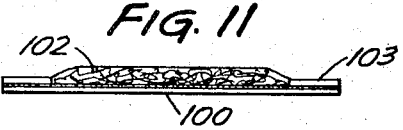
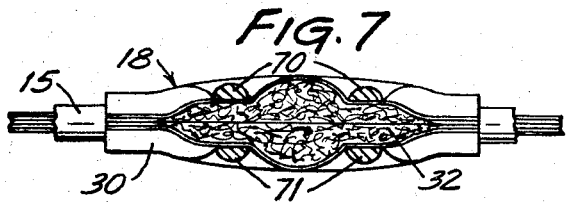
INVENTOR.
ZOLTAN B. DIENES
BY
Carpenter, Kinney & Coulter
ATTORNEYS

United States Patent Office 3,419,669
Patented Dec. 31, 1968

3,419,669
FLEXIBLE MOLD AND CABLE SPLICE
Zoltan B. Dienes, St. Paul, Minn., assignor to Minnesota Mining and Manufacturing Company, St. Paul, Minn., a corporation of Delaware
Filed Mar. 15, 1965, Ser. No. 439,906
11 Claims. (Cl. 174—84)

ABSTRACT OF THE DISCLOSURE

A sheet material comprising a liquid-retaining flexible film with two conformable adherent margins and a central thick crush-resistant open porous pad for folding around cable splice areas to provide an open-top envelope or mold for a self-hardening liquid encapsulating agent.

---

This invention relates in general to the jointing and terminating of electrical cables, and in one important aspect, to the insulative covering or enclosing of joint or splice areas in insulated power cables. The invention encompasses novel splice-enclosing mold means as well as methods of application thereof and novel splice enclosures prepared therewith.

Splice areas in power cables are conventionally insulated and protected with self-curing resinous compositions applied in liquid form. For this purpose various configurations of molds have been suggested. Preformed rigid molds are restricted as to cable dimensions and splice locations. In many instances the mold components must be placed over the cable-ends prior to connection and subsequently assembled in place, which precludes their use on certain forms of cable connections. Examples of typical preformed rigid molds are shown in U.S. Patents Nos. 2,862,042 and 2,908,744. Another type of mold, described in U.S. Patent No. 2,967,795, is constructed at the splice area and requires careful and extensive hand labor.

The present invention provides a number of advances and advantages over these prior art structures and procedures. There is provided a flexible compact unitary sheet-like mold member which may be placed by hand around the joint or termination area in a minimum of time and with which a leak-free seal may be formed around cables of widely different diameters and in many different configurations. A particular advantage is that the mold member may be placed around cable splice areas in crowded locations, for example where the cable is close to a wall surface and cannot easily be moved outwardly to provide additional work space.

These and other advantages are now attained by employing as the mold component a flexible sheet material comprising an impervious stretch-resistant backing provided with conformable adhesive outer edge areas and a crush-resistant open porous and preferably fibrous pad or mat. The sheet is folded about the joint or termination area so that the edge adhesive strips are conformed and sealed to the cable and against themselves. The fibrous mat is thereby folded about the splice area, but with exposed edges of the mat providing a readily accessible opening into which the liquid self-hardening resin is then poured. The impervious backing retains the liquid in position about the splice area during the filling and hardening period.

The invention will be more readily understood by reference to the illustrative drawing, in which:

FIGURE 1 illustrates a mold member extended beneath a cable splice area;

FIGURE 2 is a side elevation of the mold member folded into position around the cable splice area;

FIGURE 3 is a partial section of the mold member of FIGURE 1 taken along lines 3—3;

FIGURE 4 is an end elevation, FIGURE 5 a central section taken at line 5—5, and FIGURE 6 a top plan view, of the assembly of FIGURE 2;

FIGURE 7 is a plan view of an assembly similar to that of FIGURES 2–6 modified by the inclusion of clamping members shown in partial section;

FIGURES 8 and 10 are plan views, and FIGURES 9 and 11 are corresponding central sectional views in elevation, of alternative mold member structures.

The splice area illustrated in FIGURE 1 shows an example of a line splice in which a connecting insulated cable 15 is tapped onto a main insulated cable 16 at bared central sections of each and without severing either. A wrap-around splice is illustrated for simplicity, but connection by clamp or sleeve or in other ways is equally operable. Typically, the cable 16 may be situated close to a vertical wall, and cable 15 is spliced onto cable 16 to provide local service connections. In such a situation the mold member 18 is conveniently slid between the splice area and the wall, in the position shown in FIGURE 1.

The mold member 18, as further indicated in FIGURE 3, consists of a thin resin-impervious stretch-resistant film backing 30 having an adhesive layer 31 to which is bonded a central crush-resistant open fibrous mat 32 between two parallel edge strips of conformable porous sponge-like adhesive bonding material 33. The exposed surfaces of the strips 33 are normally protected by temporary coverings 34 which are removed prior to installation. The fibrous mat is of considerably greater thickness than the adhesive sponge and is beveled away from the sponge as shown at 35.

To form the mold, the lower half of the sheet 18 as shown in FIGURE 1, and from which the protective strips 34 have been removed, is folded up and around the splice area and into approximate alignment with the upper half as illustrated in FIGURES 2, 4, 5 and 6. The adhesive sponge is pressed tightly around the cables and against itself to form a resin-impervious seal along each end of the assembly as shown in FIGURES 4 and 6. The crush-resistant mat 32 holds the film 30 away from the splice area as shown in FIGURE 5, and provides an open mouth along the upper edge of the mold as shown in FIGURE 6. The mold is then filled to the desired level with self-hardening liquid encapsulating compound which is poured in through the open mouth and completely fills the open spaces around the splice area.

The amount of liquid compound required may be considerably reduced by first applying suitable closure members across the open mouth of the mold. FIGURE 7 illustrates the procedure by means of a pair of bifurcate clamps which typically may be ordinary one-piece wooden clothespins. The opposing legs 70, 71 of the pins press the sides of the mold inwardly but still leave adequate open area to permit entry of the liquid compound and escape of displaced air. The pins may be removed after the compound has hardened.

FIGURES 8 and 9 illustrate an alternative mold member structure wherein the adhesive sponge 33 of FIGURES 1–6 is replaced by relatively narrow strips of adherent mastic 83. The mastic is shown as retained within grooves formed in the backing 80 which in this case may be a flexible metal foil. The crush-resistant fibrous mat 82 covers the central area of the foil. An adhesive coating 86 may cover the surfaces of the edge areas if desired but is not essential, the adherent mastic 83 affording full sealing and bonding properties. The metal foil may be connected to ground to serve as a shielding member if desired.

The adhesive sponge strip 103 extends around all four edge areas of the mold member of FIGURES 10 and 11, thereby permitting the open mouth area formed on folding the member to be closed to any extent desired. Such a structure is particularly useful in providing a temporary protective covering over a splice area. The entire member may be easily removed to permit completion or alteration of the enclosed splice; or the mouth area may subsequently be opened, by simply removing all or part of the bonded upper margins and exposing the edges of the enclosed fibrous mat, to permit entry of liquid encapsulating compound.

For most splices involving only or two cables the essentially square shape of mold member illustrated in FIGURE 1 forms as easily applied, readily conformable mold of adequate capacity, provides for efficient utilization of materials and ease of manufacture, and is preferred. Other specialized shapes are also useful and may be preferred for specific purposes. As an example, an elongate rectangular member permits the enclosure of multiple splice areas or splices of larger dimensions since a mold of increased depth may then be constructed. Mold members of generally circular, oval, or other specialized shapes are likewise contemplated. The two adhesive edges at each end of the lateral fold line are in each instance in opposing configuration.

The fibrous mat will ordinarily be adherently bonded to the surface of the impervious backing since it then serves to reinforce the film and cannot be accidentally displaced. Bonding with an intervening adhesive layer is effective; or the web may itself form a bond with the film when one or each is formed of suitable material and suitably activated, e.g. with a solvent or by surface heating. In another form the web is simultaneously reinforced and bonded to the film with a resinous saturant or treating agent. Partial bonding, e.g. along spaced strips or at spaced points, is adequate for web retention where the non-reinforced film is adequately resistant to deformation under the strains and at the temperatures attained during use.

Crush resistance sufficient to maintain adequate spacing between film and splice area, accompanied by extremely open structure for easy flow of liquid resins, is obtained by forming the fibrous mat from intermingled crimped stiff fibers or filaments of relatively large diameter and which are further reinforced and bonded together with a hard binder material. Flexible non-fibrous open porous sponge structures of sufficient stiffness are also applicable. For most powerline splices a thickness of about one-half inch is preferred; and the mat retains substantially this full thickness over the entire splice area under the pressures involved in forming the mold while still permitting almost entirely unrestricted flow of liquid encapsulating materials into all parts of the area.

The conformable adhesive layer 33 preferably comprises a soft collapsible synthetic sponge, such as a polyurethane foam having interconnected voids and which has been coated and impregnated with a solution of normally tacky pressure-sensitive adhesive. The internally adhesive coated sponge compresses easily under finger pressure and when once compressed tends to remain in the thinner configuration due to the cohesion of the adhesive coatings. The somewhat thicker outer surface coating of adhesive adheres well to the cable coating as well as bonding strongly to itself, and resists displacement under the forces produced by the presence of the liquid encapsulating material in the completed mold. Conformability and adhesive sealing may alternatively be obtained with a coherent mastic, which flows rather than compresses under application pressures, all as indicated in conjunction with FIGURES 8 and 9. "Scotch-Calk" mastic calking compound in strip form is a preferred example of such a material.

Many impregnating and encapsulating materials are available and are useful in completing the splice protective structure here described. Thermoplastic materials which harden or solidify on cooling are adequate in some instances and are represented by asphalt, paraffin, and various other waxy or resinous materials. Much stronger and more permanent coverings are produced with self-hardening liquid or liquefied resinous compositions such as alkyd resins or, more particularly, liquid epoxy resins. Suitable curing agents, catalysts or activators, and other modifiers as desired are blended with the resin just before use. The liquid resin is then poured into the mold where it first completely fills all voids and then hardens to form a permanent protective covering for the enclosed splice area.

The following illustrative but non-limiting example will serve further to describe the invention.

An 8-inch-wide strip of one-half mil oriented Mylar polyester film is coated uniformly over one surface with about 3 to 4 mils of rubber-resin type heat-resistant pressure positive-sensitive adhesive applied from solution in a volatile solvent and dried. A mixture of natural rubber, tackifier resin, and compatible reactive phenolic resin is typical of useful heat-resistant pressure-sensitive adhesives.

A sheet of polyurethane foam having a nominal thickness of one-quarter inch is impregnated with a further quantity of the adhesive solution and dried. The foam has a continuous structure of interconnected pores, nominally about 100 per inch, within the soft flexible sheet. The pores are only partially filled with the dried adhesive residue and the coated sheet may be compressed by finger pressure to a thickness of not more than about 30 mils, after which it exhibits almost no recovery. A cover-paper consisting of flat paper coated with a low adhesion coating is separately coated with a thin layer of the adhesive which is dried. The treated foam is laid against the adhesive surface. Strips of the foam, attached to the paper, are then laid in place on the adhesive-coated edge surfaces of the coated film. The strips are 1½ inches in width.

A quantity of crimped Dacron polyester fibers, 12 crimps per inch, ½ to 3 inch and primarily 1½ inch in length, of 140 micron diameter, is formed into a nonwoven loose web on a "Rando-Webber" web-forming machine (sold by Curlator Corp., Rochester, N.Y.) or on a garnetting or carding machine. The web is one-half inch in thickness and weighs approximately ¾ lb. per sq. yd. It is passed directly from the web-forming machine between a pair of squeeze rolls where a 20 percent solution in a volatile solvent of a curable epoxy resin binder is applied, the weight of resin after drying and curing being approximately equal to the initial weight of the fibrous web. The resin is cured by passing the web through an oven at 300° F. for one to two minutes. The resin coats the individual fibers and accumulates at contact points between fibers as small beads or droplets. The web is rigidified and strengthened to the extent that full length individual fibers can scarcely be removed from the mass, which however remains extremely open and porous. The web is slit to five inch width and skived or trimmed along opposite edges at an angle of about 45 degrees over the outer quarter inch of thickness. The strip is then pressed onto the adhesive-coated film between the parallel strips of adhesive foam after which the product is cut into square segments for use as mold members.

The protective cover-strips are removed from one such mold member which is then applied around a cable splice area as shown in FIGURES 1 and 2. The adhesive edges are firmly pressed together and against the cable insulation under finger pressure to obtain a leak-proof seal as illustrated in FIGURE 4, the adhesive-treated foam compressing to a final retained thickness of about $\frac{1}{32}$ inch. A liquid self-curing epoxy resin composition is prepared by mixing together liquid epoxy resin and liquid curing agents and activators, and the liquid is poured into the mold through the open mouth formed at the upper edge. The liquid fills the lower portion of the mold and covers the cable and splice area to a depth of somewhat more than one-half inch. The resin rapidly cures to a hard solid at which time the cable section may be put in service. The splice area is completely encapsulated in the substantially void-free resin. The fibrous mat reinforces the resin and prevents cracking thereof under severe mechanical stress.

The mold member as illustrated in FIGURE 10 may be employed in the procedure just described, in which case the adhesive strips on the end edge areas may either be held apart until the resin had been applied, or may first be removed. The same member is also useful in forming a termination mold. In one typical procedure, the adhesive strip is removed from one end and one side. The member is then wrapped around the cable with the adhesive-free end extended beyond the termination area and the remaining end adhesive strip being conformably adhered around the cable. The remaining side adhesive strip is adhered to the outer surface of the backing, to form an open-ended cup-like mold at the termination area. Liquid sealing compound is then poured into the mold at the open end and around the extended conductor, to form an effectively sealed termination.

For the termination mold just described it will be seen that the crush-resistant porous mat may extend to the edge of the backing at two adjacent edges, rather than at two opposite edges as illustrated in FIGURES 1 and 8. In such cases conformability of the mold member to the cable is improved by beveling or sloping the mat to the adhesive-free edge as well as to the edge of the adhesive strip. Beveling is not essential, however, and may be omitted in any of the structures described where the adhesive strip is of sufficient width and the adhesive of sufficient strength to maintain an essentially liquid-tight seal prior to hardening of the liquid compound. The porous crush-resistant mat may be of varying thickness provided the minimum thickness adjacent the conductor is sufficient to produce the thickness of insulation required for the anticipated service conditions.

Heat-resistant rubber-resin type normally tacky pressure-sensitive adhesives as hereinbefore described are well known in the masking tape or adhesive tape art. They form strong adhesive bonds with cable insulation and, when employed in conjunction with an easily conformable support such as the polyurethane foam of the example, form an excellent seal. Mastic calking compounds, although not meeting the requirements of pressure-sensitive tape adhesives, are nonetheless effective for the purposes here described. They are conformable and tacky, and form an adequate bond to the cable insulation; and the adhesive surfaces cohere strongly together. In particular, the mastic is capable of plastic flow under continued finger pressure so that any leaks occurring at the sealed surfaces may be stopped by manipulation of the mass even after the liquid resinous compound has been applied.

What is claimed is as follows:

1. A flexible unitary conformable mold member comprising a flexible imperforate film backing having opposing side edges each symmetrical with respect to a central lateral fold line; a narrow compressible and conformable porous thick tacky adhesive strip extending along each side edge area; and a central crush-resistant thick porous spacer web of intermeshed crimped stiff fibers bonded to said backing between said adhesive strips.

2. A flexible unitary conformable mold member comprising a flexible imperforate film backing having opposing side edges each symmetrical with respect to a central lateral fold line, said film having over one entire surface an adhesive coating of uniform thickness; a narrow conformable tacky adhesive strip extending along each side edge area; and a crush-resistant thick porous spacer web of intermeshed and interbonded crimped stiff fibers covering the area between said edge strips and bonded to said backing by said adhesive coating.

3. A cable section having a splice area within an envelope comprising a folded strip of sheet material having an outer integral flexible imperforate backing bonded to a wide central crush-resistant thick porous spacer web of intermeshed stiff fibers surrounding the splice area and having a narrow tacky conformable adhesive edge strip along each side edge of said backing, the opposing portions of each adhesive edge strip on opposite sides of the fold line of said sheet material being adhered around the cables and to each other to provide closed ends of the envelope.

4. A structure as defined in claim 3 in which the envelope surrounding the splice area is filled with a hardened insulating composition internally reinforced with said fibers.

5. A flexible unitary conformable mold member suitable for enveloping a cable splice area to permit resinous encapsulation of the splice and comprising: a flexible thin resin-retaining imperforate backing sheet having on one face thereof opposing side margins symmetrical with respect to a central lateral fold line; a narrow conformable tacky adhesive strip extending only along each side margin; and a thick crush-resistant open porous fibrous spacer web extending over the remainder of said face of said sheet between the ends and the said side margins thereof.

6. A flexible unitary conformable mold member suitable for enveloping a cable splice area to permit encapsulation of the splice with a self-hardening liquid and comprising: a flexible thin liquid-impervious integral backing sheet; a thick crush-resistant open porous spacer web covering the entire area of one face of said sheet exclusive of two narrow marginal areas; and a narrow conformable tacky adhesive strip extending along said two marginal areas.

7. The mold member of claim 6 wherein the adhesive strip is a thick narrow ribbon of adherent mastic centrally longitudinally disposed along said margins.

8. The mold member of claim 6 wherein the adhesive strip comprises a soft collapsible polymeric open porous foam internally and externally coated with normally tacky pressure-sensitive adhesive.

9. The mold member of claim 6 wherein the spacer web is adherently bonded to the backing sheet by means of an intervening coextensive continuous adhesive layer.

10. The mold member of claim 6 wherein the spacer web is unified and bonded to the backing sheet with a resinous binder.

11. A normally flat flexible unitary conformable mold member suitable for folding along a lateral fold line thereof and about a cable splice area in preparation for encapsulating the splice with a self-hardening liquid and comprising: a thin flexible conformable imperforate film backing having opposing side margins each symmetrical with respect to said fold line; a thick crush-resistant open porous fibrous spacer web covering the entire face of said backing between said margins and sloping at an angle of about 45 degrees from its full thickness toward each of said margins; and a narrow conformable tacky adhesive strip extending along each of said margins.

References Cited

UNITED STATES PATENTS

| 2,267,630 | 12/1941 | Weiland | 174—84 |
| 2,429,258 | 10/1947 | Boyle | 174—84 |
| 2,967,795 | 1/1961 | Bollmeier et al. | 174—76 X |
| 3,177,528 | 4/1965 | Flower et al. | 25—127 |

DARRELL L. CLAY, *Primary Examiner.*

U.S. Cl. X.R.

18—47; 249—173; 161—406; 174—76, 93